US012762008B2

(12) United States Patent
Singh et al.

(10) Patent No.: US 12,762,008 B2
(45) Date of Patent: Oct. 13, 2026

(54) SPECIFICATION MAPPING AND MESSAGE CORRECTION FOR REDUCING MESSAGE REJECTIONS

(71) Applicant: MASTERCARD INTERNATIONAL INCORPORATED, Purchase, NY (US)

(72) Inventors: Sachin Kumar Singh, Pune (IN); Kaushal Shetty, O'Fallon, MS (US); Mayank Joshi, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/741,713

(22) Filed: Jun. 12, 2024

(65) Prior Publication Data

US 2025/0383953 A1 Dec. 18, 2025

(51) Int. Cl.
*G06F 11/07* (2006.01)
*G06F 9/54* (2006.01)

(52) U.S. Cl.
CPC .......... *G06F 11/0793* (2013.01); *G06F 9/546* (2013.01); *G06F 11/0721* (2013.01)

(58) Field of Classification Search
CPC .. G06F 9/546; G06F 11/0721; G06F 11/0793; G06F 40/174
See application file for complete search history.

(56) References Cited

U.S. PATENT DOCUMENTS 8,234,562 B1 * 7/2012 Evans .................. G06F 40/174 715/224
10,938,515 B2 3/2021 Soultan et al.
(Continued)

OTHER PUBLICATIONS

Logging Cheat Sheet, OWASP, May 24, 2024. Retrieved from the Internet: <URL: https://web.archive.org/web/20240524044655/https://cheatsheetseries.owasp.org/cheatsheets/Input_Validation_Cheat_Sheet.html> (Year: 2024).*
(Continued)

*Primary Examiner* — Ashish Thomas
*Assistant Examiner* — Bryan P Huang
(74) *Attorney, Agent, or Firm* — Barta Jones, PLLC

(57) ABSTRACT

Aspects of the disclosure map transaction requests to message specifications. A message correction manager dynamically updates message specifications in real-time to obtain the most up-to-date versions. The message correction manager maps a transaction request to the message specification associated with a designated recipient of the transaction request. The message correction manager identifies noncompliant message elements which fail to comply with the specification. The message correction manager corrects the noncompliant message elements automatically. The corrected transaction request is submitted to the recipient in a first submission attempt prior to any message rejections from the recipient, based on noncompliance with the specification, to reduce transaction request rejections. By reducing rejections of transaction requests, the system reduces usage of memory, processing and network resources used in resubmitting transaction requests after receiving message rejections based on noncompliance with the specifications.

20 Claims, 10 Drawing Sheets

(56) References Cited

U.S. PATENT DOCUMENTS

| | | | | |
|---|---|---|---|---|
| 10,942,967 | B1 | 3/2021 | Biessmann et al. | |
| 10,977,430 | B1 * | 4/2021 | Horesh | G06N 5/04 |
| 11,010,731 | B1 * | 5/2021 | McGinlay | G06Q 20/401 |
| 11,568,357 | B2 | 1/2023 | Shackelford et al. | |
| 11,657,912 | B2 | 5/2023 | Dunn et al. | |
| 2005/0055290 | A1 * | 3/2005 | Bross | G06Q 30/06 705/31 |
| 2020/0076538 | A1 * | 3/2020 | Soultan | H04L 41/145 |
| 2022/0019732 | A1 * | 1/2022 | Hersbach | G06F 40/103 |
| 2022/0051219 | A1 | 2/2022 | Sells et al. | |
| 2022/0131904 | A1 | 4/2022 | Wright et al. | |

OTHER PUBLICATIONS

List box, Wikipedia, May 21, 2024. Retrieved from the Internet: <URL: https://en.wikipedia.org/w/index.php?title=List_box&oldid=1224881234> (Year: 2024).*

Logging Cheat Sheet, OWASP, Jun. 16, 2024. Retrieved from the Internet: <URL: https://web.archive.org/web/20240616155337/https://cheatsheetseries.owasp.org/cheatsheets/Logging_Cheat_Sheet.html> (Year: 2024).*

Transaction Failure Rates, Tideways, May 29, 2024. Retrieved from the Internet: <URL: https://web.archive.org/web/20240529174158/https://support.tideways.com/documentation/reference/notifications/transaction-failure-rates.html> (Year: 2024).*

"The Authoritative Dictionary of IEEE Standard Terms, Seventh Edition," in IEEE Std 100-2100, Dec. 11, 2000 (Year: 2000).*

Ha, My Ngo. "What is a Transaction ID? The basic knowledge of Transaction ID". Magenest. Apr. 12, 2021. Retrieved from the Internet <URL:https://store.magenest.com/blog/transaction-id/> (Year: 2021).*

"Standards MT Nov. 2022 General Information". Jul. 22, 2022 (Year: 2022).*

Ramdani et al., "R-TNCES Rebuilding: A New Method of CTL Model Update for Reconfigurable Systems", In Proceedings of the 14th International Conference on Evaluation of Novel Approaches to Software Engineering (ENASE 2019), copyright 2019, pp. 159-168.

* cited by examiner

800

| Data Element/Field Name | Description | Source | Length/Format/Values | Device Channel | Message Category | Message Inclusion | Conditional Inclusion |
|---|---|---|---|---|---|---|---|
| Message Version Number<br>Field Name:<br>[illegible] | Protocol version identifier This shall be the Protocol Version Number of the specification utilised by the system creating this message.<br>The Message Version Number is set by the 3DS Server which originates the protocol with the AReq message. The Message Version Number does not change during a 3DS transaction. | 3DS Server | Length: Variable, 5–8 characters<br>JSON Data Type: String<br>Value accepted:<br>Refer to Table 1.5 | 01-APP<br>02-BRW<br>03-3RI | 01-PA<br>02-NPA | AReq = R<br>ARes = R<br>CReq = R<br>CRes = R<br>PReq = R<br>PRes = R<br>RReq = R<br>RRes = R<br>Erro = R | |
| Notification URL<br>Field Name:<br>notificationURL | Fully qualified URL of the system that receives the CRes message or Error Message. The CRes message is posted by the ACS through the Cardholder browser at the end of the challenge and receipt of the RRes message. | 3DS Server | Length: Variable, maximum 256 characters<br>JSON Data Type: String<br>Value accepted: Fully Qualified URL. | 02-BRW | 01-PA<br>02-NPA | AReq = R | |

FIG. 8

900

Sample Request for App based payment authentication request:

"messageVersion": "2.1.0",
"deviceChannel": "01",
"messageCategory": "01",
"threeDSRequestorAuthenticationInd": "06",
"threeDSRequestorID": "MAS00001_242666",
"threeDSRequestorName": "Mastercard 3DS Requestor",
"threeDSRequestorChallengeInd": "04",
"sdkAppID": "d12345e0-67f3-23e5-a151-feff891cdc9f",
"sdkReferenceNumber": "3DS_LOA_SDK_PPFU_020200_00007",
"sdkTransID": "d12345e0-67f3-23e5-a151-feff891cdc9f",
"name": "AES Consent Extension Request",
"criticalityIndicator": false,
"id": "A000000004-aesConsentAReq"

*FIG. 9*

SPECIFICATION MAPPING AND MESSAGE CORRECTION FOR REDUCING MESSAGE REJECTIONS

BACKGROUND

When a transaction request is sent to a recipient, the contents of the transaction request are required to conform to the standards and specifications of the computing system and/or network receiving the message. If the transaction request fails to conform to the expected format, data limits and other protocols and rules, the message may be rejected. In such cases, the sender typically performs manual corrections to the request and attempts to resend the message a second time. The message may be accepted, or it may be rejected a second time, requiring the user to repeat the process of correcting, and resubmitting the message. This is a technologically inefficient, time consuming and computing resource intensive process.

SUMMARY

Some examples provide a system for specification mapping to reduce transaction request rejections. The system includes a processor and a computer-readable medium storing instructions that are operative upon execution by the processor to map a transaction request to a message specification associated with a recipient. The recipient is a computing system associated with an entity designated to receive the transaction request. The message specification includes a set of rules for acceptance of a message by the recipient. A message correction manager identifies one or more noncompliant message elements in the transaction request based on mapping the transaction request to the message specification. The message correction manager corrects the one or more noncompliant message elements prior to a first attempt to submit the transaction request to the recipient. This creates a corrected transaction request. The noncompliant message elements are corrected automatically to comply with the message specification of the recipient before any rejections of the transaction request are received from the recipient. The corrected transaction request is submitted to the recipient via a network.

Other examples provide a method for smart message specification mapping to reduce message rejections. A message correction manager receives a transaction request generated by a requester. The transaction request includes a message format, a plurality of data fields, and/or message data. The message correction manager analyzes the transaction request using a message specification associated with a designated recipient of the transaction request at a first submission attempt. The message specification describes a set of rules associated with the message format, the plurality of data fields, and/or the message data required for acceptance of a message by the designated recipient. The message correction manager identifies a noncompliant message element in the transaction request based on analysis of the transaction request using the message specification. The noncompliant message element is a portion of the transaction request that fails to comply with the message specification. The message correction manager corrects the noncompliant message element dynamically for the first submission attempt. The message correction manager submits the corrected transaction request to the recipient at the first submission attempt via a network. The corrected transaction request is corrected to comply with the message specification of the recipient without rejection of the transaction request by the recipient.

Still other examples provide a computer storage device having computer-executable instructions stored thereon, which, upon execution by a computer, cause the computer to perform operations including mapping a transaction request to a message specification associated with a recipient. A noncompliant message element in the transaction request is identified. The noncompliant message element is corrected automatically to conform with the message specification of the recipient without a rejection of the transaction request by the recipient. The corrected transaction request is submitted to the recipient via a network without rejection of the transaction request by the recipient. An audit log is updated with a record indicating correction of the noncompliant message element associated with the corrected transaction request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an exemplary table illustrating elements of a transaction request.

FIG. 9 is an exemplary request for an application based payment authorization request.

Corresponding reference characters indicate corresponding parts throughout the drawings. Any of the figures may be combined into a single example or embodiment.

DETAILED DESCRIPTION

Figure 1:
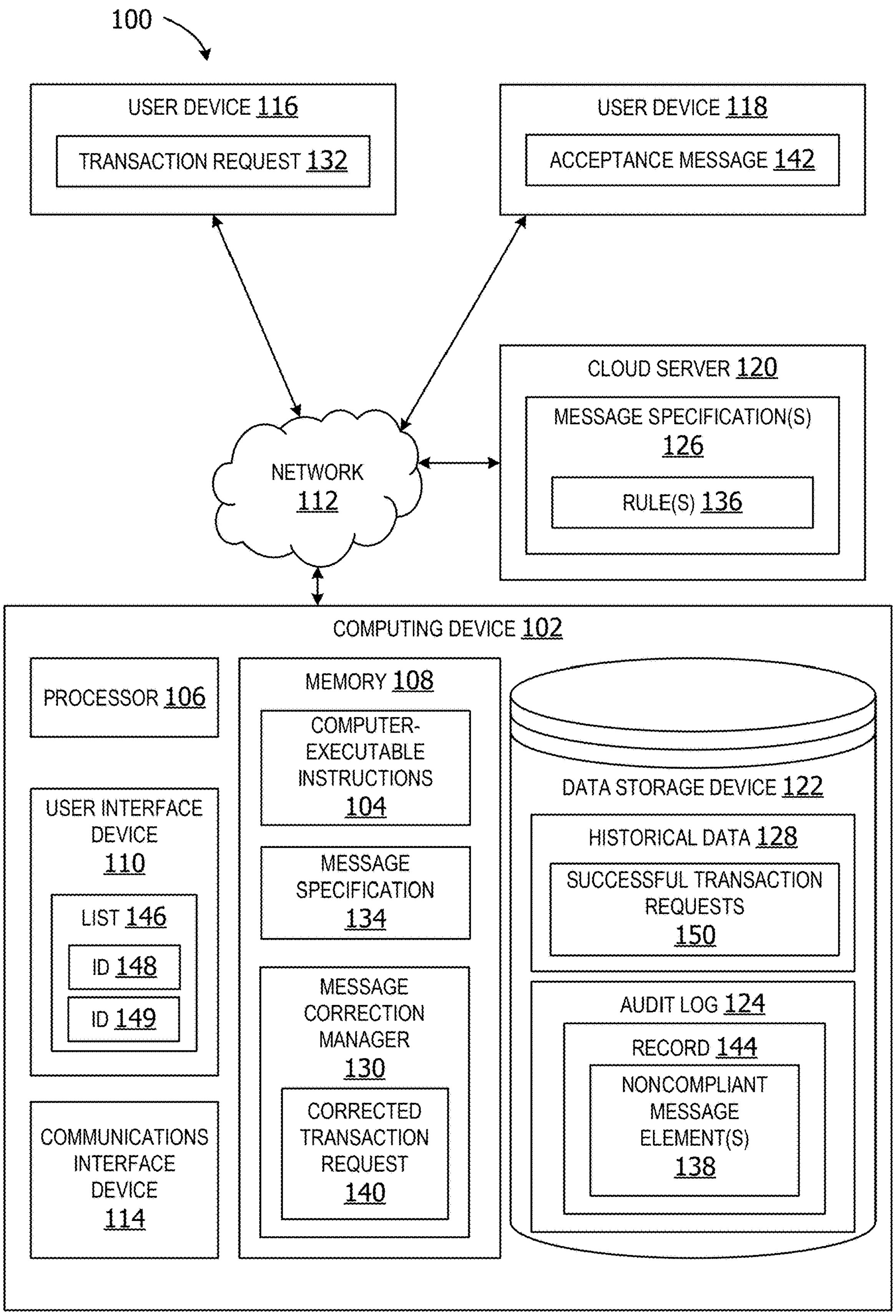
FIG. 1 is an exemplary block diagram illustrating a system for smart mapping of message specifications for correcting transaction requests.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable automatic correction of transaction requests without receiving a message rejection and/or without requiring multiple message submission attempts. In this manner, the system auto-corrects transaction requests in real-time during a first message submission attempt to prevent rejection of messages which would have failed to comply with the message specifications associated with the recipient. This reduces the message rejection rate, thereby reducing system resource usage associated with failed message re-submissions.

In some examples, the system automatically corrects the noncompliant message element prior to a first attempt to submit the transaction request to the recipient. The noncompliant message element is corrected automatically to create a corrected version of the original transaction request which complies with the message specification of the recipient. This avoids rejection of the transaction request at the first submission attempt such that the recipient does not reject the transaction request and the sender of the transaction request does not receive a rejection message. This reduces system processor usage which would be expended in processing rejection messages from recipients, and processor usage associated with multiple re-submissions of transaction requests following each rejection of the transaction requests by the recipients. This further reduces network bandwidth usage which would otherwise be consumed for each resubmission of a transaction request.

The message correction manager corrects a transaction request to comply with the message specification of the recipient, prior to submission of the transaction request to the recipient. The message correction manager submits the corrected transaction request to the recipient via a network at a first submission attempt, and there is no rejection of the transaction request by the recipient for failing to comply with the message specification of the recipient. Thus, the system enables a single submission of the request, thereby avoiding multiple submission attempts to obtain compliance with the message specification of the recipient. This reduces network bandwidth usage by limiting each transaction request to a single submission attempt.

The system in other examples provides an audit log which is used to record all corrections to transaction requests which are made by the message correction manager. The audit log provides records which can be reviewed or analyzed to monitor message rejection rates. If message corrections begin to increase, the system notifies a user and/or begins self-diagnostics to identify the error(s) which may be contributing to higher message corrections. This further reduces the error rate and improves system security by monitoring the system for malicious activity and/or other issues which may be contributing to errors. The transaction request may be rejected for reasons other than noncompliance with the specification of the recipient, and the audit log may also record these rejections for analysis.

Still other examples provide for the dynamic update of message specifications and/or other rules associated with acceptance or rejection of messages by one or more recipients. The system obtains specification updates in real-time from one or more online sources of message specification data rather than storing the specifications and/or rules in a local data store. This further reduces system memory resource usage while ensuring the message correction manager has access to the most up-to-date versions of the message specifications.

The system in some examples provides summaries of the transaction request corrections and/or audit log records for viewing by one or more users via a user interface (UI) on a computing device. A transaction request identifier (ID) for each corrected message is presented in a list or other set of records for viewing by the user. The user clicks on an entry or record to view more details associated with the elements of the message which were corrected in each message. This improves user efficiency via the UI and increases user interaction performance.

Moreover, the audit log entries presented to users in the list enables the user to obtain additional information associated with corrected messages to troubleshoot the sender's computing system and/or improve transaction request generation processes of the sender to reduce the number of transaction requests requiring correction. This further enables improvement of the sender's computing system and message generation processes for greater system technological efficiency and accuracy.

The computing device operates in an unconventional manner at least by automatically correcting transaction requests in real-time using mapped message specifications to reduce processor, memory, and network bandwidth usage by the system, thereby improving functioning of the underlying computing device. The system further reduces message rejection rates and message errors for improved system performance and security.

Referring again to FIG. 1, an exemplary block diagram illustrates a system 100 for smart mapping of message specifications for correcting transaction requests. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 5, FIG. 6, and FIG. 7).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to the user device 116, the user device 118 and/or the cloud server 120, can occur using any protocol or mechanism over any wired or wireless connection. In some examples, the communications interface device 114 is operable with short range communication technologies such as by using near-field communication (NFC) tags.

The user device 116 and/or the user device 118 represent any device executing computer-executable instructions. The user device 116 and/or the user device 118 can be implemented as a mobile computing device, such as, but not limited to, a wearable computing device, a mobile telephone, laptop, tablet, computing pad, netbook, gaming device, and/or any other portable device. The user device 116 and/or the user device 118 includes at least one processor and a memory. The user device 116 and/or the user device 118 can also include a user interface device.

The cloud server 120 is a logical server providing services to the computing device 102 or other clients, such as, but not limited to, the user device 116 and/or the user device 118. The cloud server 120 is hosted and/or delivered via the network 112. In some non-limiting examples, the cloud server 120 is associated with one or more physical servers in one or more data centers. In other examples, the cloud server 120 is associated with a distributed network of servers.

The system 100 can optionally include a data storage device 122 for storing data, such as, but not limited to, an audit log 124 and/or historical data 128. The data storage device 122 can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 122 includes a database.

The data storage device 122 in this example is included within the computing device 102, attached to the computing device, plugged into the computing device, or otherwise associated with the computing device 102. In other examples, the data storage device 122 includes a remote data storage accessed by the computing device via the network 112, such as a remote data storage device, a data storage in a remote data center, or a cloud storage.

However, the examples are not limited to a physical data storage device. In other examples, the computing device 102 stores data, such as the audit log 124 and/or historical data 128 on a cloud storage or other remote data store. In these examples, the computing device 102 accessing the audit log 124, historical data 128 and/or any other data stored on the cloud storage via the network 112.

In some examples, the memory 108 includes a message correction manager 130. In some examples, the message correction manager 130 is a machine learning (ML)/artificial intelligence (AI) component including pattern recognition, modeling, and/or other machine learning algorithms to analyze transaction request data, message specification(s) 126, historical data associated with successful transaction requests, and/or any other relevant data to generate corrected transaction requests having corrected message elements.

The message correction manager 130 receives a transaction request 132 generated by a requester computing system, such as, but not limited to, the user device 116. The transaction request 132 is transmitted to the message correction manager 130 on the computing device 102 via the network 112. The transaction request 132 includes data, such as a message format, a plurality of data fields, and/or message data. The transaction request 132 is a message containing a request associated with a recipient. The transaction request 132 optionally includes a user authentication request, a payment transaction request, a login request, etc. The user authentication request includes user login requests, biometric password-less credential authentication requests, as well as any other type of request.

In this example, the transaction request 132 is generated by a requesting entity and transmitted to the message correction manager 130 via the network 112. In other examples, the transaction request 132 is optionally generated on the computing device 102.

The message correction manager 130 analyzes the transaction request 132 using a message specification 134 associated with a designated recipient of the transaction request 132. The message specification 134 is obtained from a source of message specification(s) 126. In this example, the source of message specification(s) 126 is a cloud server 120 associated with a third party entity. However, in other examples, the source can include one or more remote computing devices and/or cloud servers associated with one or more entities hosting updated message specifications for one or more recipients.

The message specification 134 is a set of one or more rule(s) 136 describing acceptable message formats, message data limits, required data fields and other specifications for a message to be accepted by a given recipient computing system. The message specification 134 sets forth the requirements for transaction requests and other messages which are constantly being updated and changed as industry standards associated with messaging protocols, security, and other requirements are evolving and changing.

The message correction manager 130 obtains updated message specification rules from one or more sources of the message specifications in real-time (e.g., via a representational state transfer (REST) application programming interface (API)) such that the message specifications are always up to date. By obtaining the message specifications via the network, this further reduces system memory and data storage resource usage on the computing device 102. In this example, the most up-to-date version of the message specifications for the designated recipient of the transaction request is obtained dynamically as the transaction request is being analyzed.

In other examples, the most up-to-date version of the message specification is obtained at the occurrence of a predetermined event. For example, the message specifications are checked/updated every day at the same time. The occurrence of the update time each day is the predetermined event which triggers the system to connect to the cloud server 120 or other source of updated message specifications to update the set of rules associated with each recipient.

In these examples, the message correction manager 130 requests the message specification updates from the cloud server 120 or other source of message specification updates. In other examples, a source of message specification updates pushes the message specification rules updates to the message correction manager 130 automatically at the occurrence of the predetermined event, such as an update day/time.

In some examples, the message correction manager 130 maps the message specification 134 to the transaction request 132 to identify one or more noncompliant message element(s) 138 in the transaction request 132 based on analysis of the transaction request using the message specification. A noncompliant message element is a portion of the transaction request 132 that fails to comply with the message specification. A noncompliant message element can include a message format error, a data limit error, a missing data field or an unneeded data field (data field error), or any other portion of the transaction request which fails to conform to message specification rules of the recipient.

The message correction manager 130 automatically corrects the noncompliant message element(s) 138 dynamically before the transaction request is submitted to the recipient at a first submission attempt. Thus, the transaction request 132 errors are corrected in real-time before the requester receives a rejection of the transaction request message from the recipient. In this example, the user device 118 is a recipient computing system. The user device 118 receives the corrected transaction request 140 in a first submission attempt. The recipient transmits an acceptance message 142 to the requester user device 116 in some examples. The acceptance message 142 indicates acceptance of the corrected transaction request 140 by the recipient because the corrected transaction request conforms to the system requirements and message specifications of the recipient.

Thus, the original version of the transaction request 132 is corrected automatically by the message correction manager 130 without the recipient ever rejecting any version of the transaction request 132. Thus, a second or third submission attempt is unnecessary as the message correction manager 130 ensures the corrected version of the transaction request 132 is accepted at the first submission attempt. This reduces network resource usage which would have been expended in processing rejection messages and resubmitting the transaction requests to the recipient in multiple submission attempts.

The update an audit log in a data storage device with a record indicating correction of the noncompliant message element, the record comprising a message identifier (ID) and description of the noncompliant element which is corrected in the corrected transaction request.

The message correction manager 130 updates the audit log 124 with a record 144 describing the changes to the original version of the transaction request 132. In some examples, the record 144 includes a message ID associated with the corrected transaction request 140 and an identification of the noncompliant message element(s) 138 which were identified and corrected by the message correction manager 130. In other examples, the record 144 includes additional information such as, but not limited to, a date and/or time the transaction request was analyzed, corrected and/or submitted to the recipient, a number of correction made, a listing of errors identified in the transaction request, as well as any other relevant information associated with the corrected transaction request 140.

The message correction manager 130, in other examples, performs automatic correction of a plurality of noncompliant message elements associated with an original version of each transaction request received by the message correction manager 130 in real-time during a first attempt to submit each of the transaction requests to the designated recipient for each request. That is, the message correction manager 130 intercepts transactions requests and checks them for compliance prior to submission. A corrected version of each transaction request is created that is in condition for acceptance by the recipient of each request without occurrence of a failed first attempt through submission of the transaction request. A record is added to the audit log for each transaction request that is corrected by the message correction manager 130.

In some examples, the audit log provides a record of changes to transaction requests which can be audited and/or analyzed to determine a rate of correction of the transaction requests and/or a rate of rejection of the transaction requests. The records associated with corrected transaction requests within the audit log can be checked in response to detecting a correction rate exceeding a threshold.

In examples in which the corrected transaction requests are still rejected by the recipient, the audit log provides a record of the rejections. If the rate of rejection exceeds a threshold, the rejection rate may indicate a problem with the correction manager, such that a virus, malicious activity, or other error may be preventing proper and accurate correction of the transaction requests. Thus, the records in the audit log further provide data which can be used for troubleshooting the message correction system as well as monitoring the rejection rate of messages.

In some examples, if the rejection rate exceeds a threshold value, a notification message is generated. The notification message identifies the error associated with the message correction manager and/or alerts the user as to the increased rejection rate. This provides users with diagnostic data and/or alerts users to potential problems for early detection of malicious attacks on the message correction manager system as well as potential malfunctions. This reduces the error rate and improves system security.

The message correction manager 130, in still other examples, generates a list 146 of corrected transaction messages generated by a message correction manager. The list 146 is presented to a user via a user interface device, such as, but not limited to, the UI device 110 associated with the computing device 102 and/or a UI associated with the user device 116. The system causes a first corrected transaction request ID 148 to be automatically moved to a top of the list 146 above a second corrected transaction request ID 149 for viewing by the user, based on a criterion such as a time of the first corrected transaction request ID 148. In some examples, a user selects or clicks on a transaction request ID in the list 146 to view additional information associated with the corrected transaction request associated with the selected transaction request ID. This enables a user to quickly and easily obtain desired information associated with any corrected transaction request for improved user efficiency.

In some examples, the AI/ML component of the message correction manager is trained using historical data 128, including successful transaction requests 150. The training data, including the historical data 128, is used to train the message correction manager to automatically identify noncompliant elements in transaction requests and automatically correct those elements to conform with current industry standards and other rules associated with designated recipients of those transaction requests.

In this example, the message correction manager 130 is hosted on a computing device 102. However, the examples are not limited to implementing the message correction manager on a computing device. In other examples, the message correction manager is hosted on a cloud server, such as, but not limited to, the cloud server 120 in FIG. 1.

Figure 2:
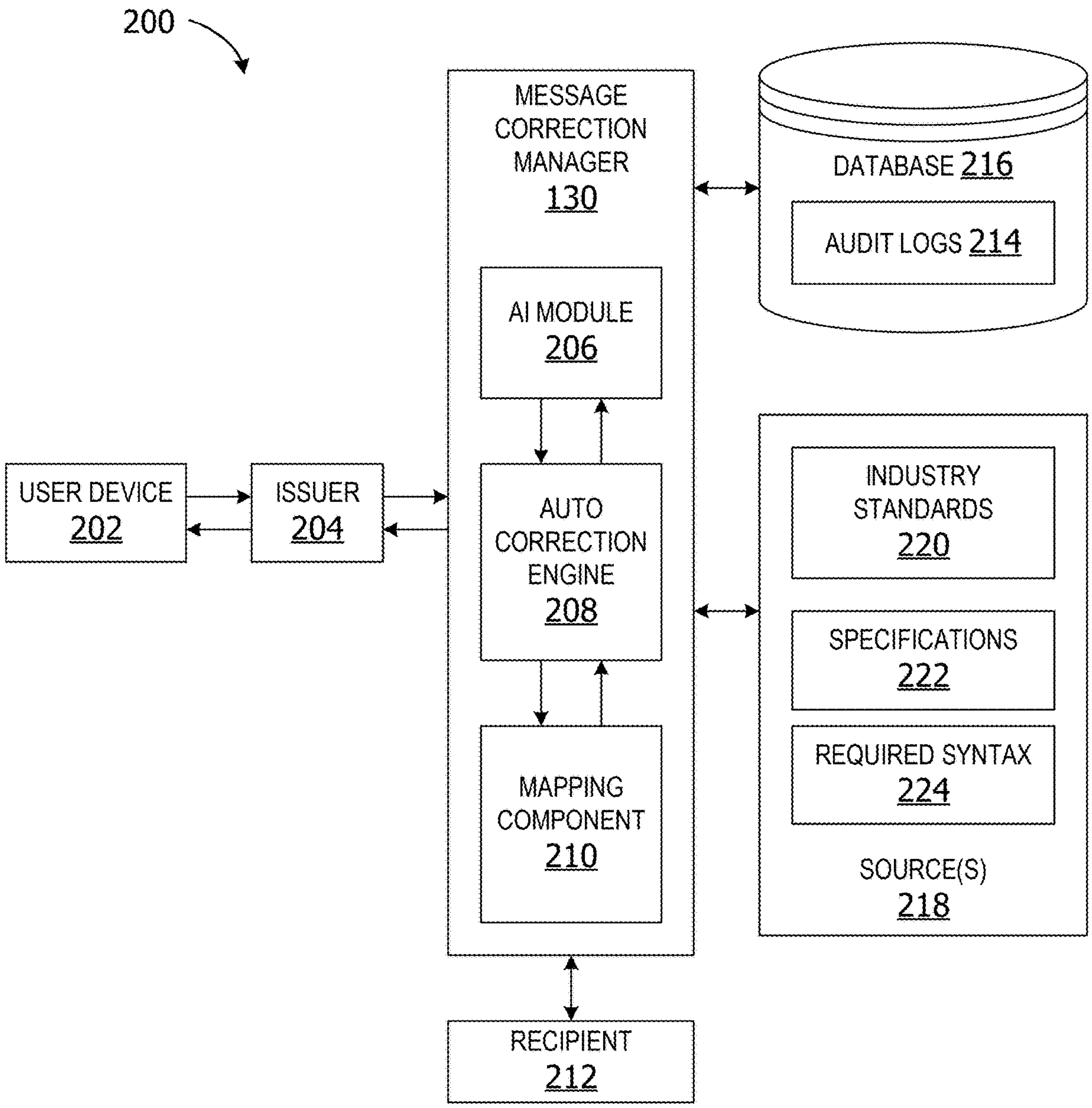
FIG. 2 is an exemplary block diagram illustrating a system for automatically correcting transaction requests without requiring resubmission of a rejected message to reduce computing resource usage.

FIG. 2 is an exemplary block diagram illustrating a system 200 for automatically correcting transaction requests without requiring resubmission of a rejected message to reduce message rejection rates. A user device 202 associated with a requesting entity generates a transaction request. In some examples, the transaction request is associated with an issuer 204, such as a payment transaction request associated with withdrawal of funds from a bank account, payment using a payment card (credit card, debit card, etc.), or any other type of payment transaction. A message correction manager 130 includes an AI module 206 having a ML component for automatically identifying noncompliant elements in transaction requests. In some examples, a mapping component 210 maps each element in the transaction request to a portion of the message specification specifying requirements for each element of the transaction request. An auto correction engine 208 automatically corrects the identified noncompliant message elements. The corrected transaction request is transmitted to the designated recipient 212 via a network. The recipient 212 represents a computing system associated with an entity receiving the transaction request and/or the corrected version of the transaction request. The message correction manager 130 updates one or more audit logs 214 in a database 216. The audit logs 214 includes one or more audit logs, such as, but not limited to, the audit log 124 in FIG. 1. The database 216 is associated with a data store, such as, but not limited to, the data storage device 122 in FIG. 1.

In some examples, the message correction manager 130 automatically checks one or more source(s) 218 of industry standards 220, required syntax 224 and/or other specifications 222 for messages associated with one or more recipients, such as the recipient 212. The source(s) 218 includes one or more sources of message specification rules. The message correction manager 130 requests updates from the one or more data source(s) 218 at an occurrence of an event, such as at a regular time interval or a scheduled update time. In other examples, the updates are pushed to the message correction manager when an update occurs. This enables the system to maintain the most up-to-date and accurate message specification data while reducing memory usage by storing out-of-date rules.

Figure 3:
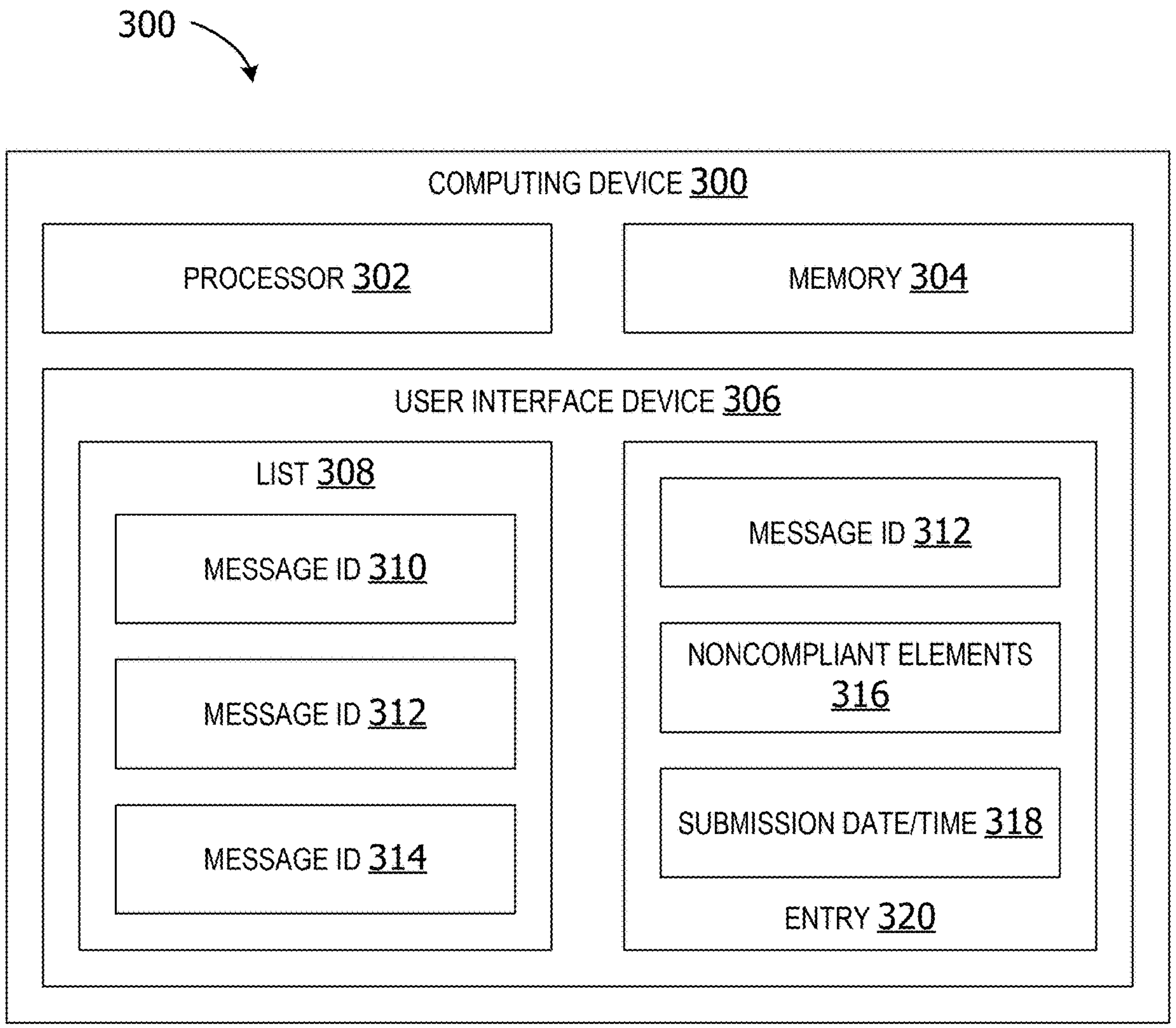
FIG. 3 is an exemplary block diagram illustrating a computing device for presenting audit log data to a user via a user interface device.

Turning now to FIG. 3 is an exemplary block diagram illustrating a computing device 300 for presenting audit log data to a user via a user interface device is shown. The computing device 300 is a device, such as, but not limited to, the computing device 102 in FIG. 1. The computing device 300 includes a processor 302, a memory 304 and/or a user interface device 306. The user interface device 306 is a UI device, such as, but not limited to, the UI device 110 in FIG. 1.

The user interface device 306 displays a list 308 of transaction requests which have been corrected by the message correction manager prior to submission of the message to the designated recipient. The list 308 includes a transaction request ID (message ID) associated with each corrected transaction request. In this example, the list 308 includes three message IDs, a first message ID 310 associated with a first corrected transaction request, a second message ID 312 associated with a second corrected transaction request and a third message ID 314 associated with a third corrected transaction request. However, the examples are not limited to a list of three corrected transaction requests. In other examples, the list includes a single corrected transaction request ID, two corrected transaction request IDs, as well as four or more corrected transaction request IDs.

A user selects a message ID to view additional information associated with a given transaction request. In this example, a user selects message ID 312 to view the noncompliant elements 316 identified by the message correction manager and a submission data/time 318 of the corrected transaction request. The additional information is displayed in an entry 320 associated with the selected message ID on the user interface device 306.

The entry 320 including the additional information is displayed next to the list 308 in this example. However, the examples are not limited to displaying the entry with the list. In other examples, when a user selects a message ID, the list is no longer displayed, and the additional information associated with the selected message ID is presented in the UI without the list.

Figure 4:
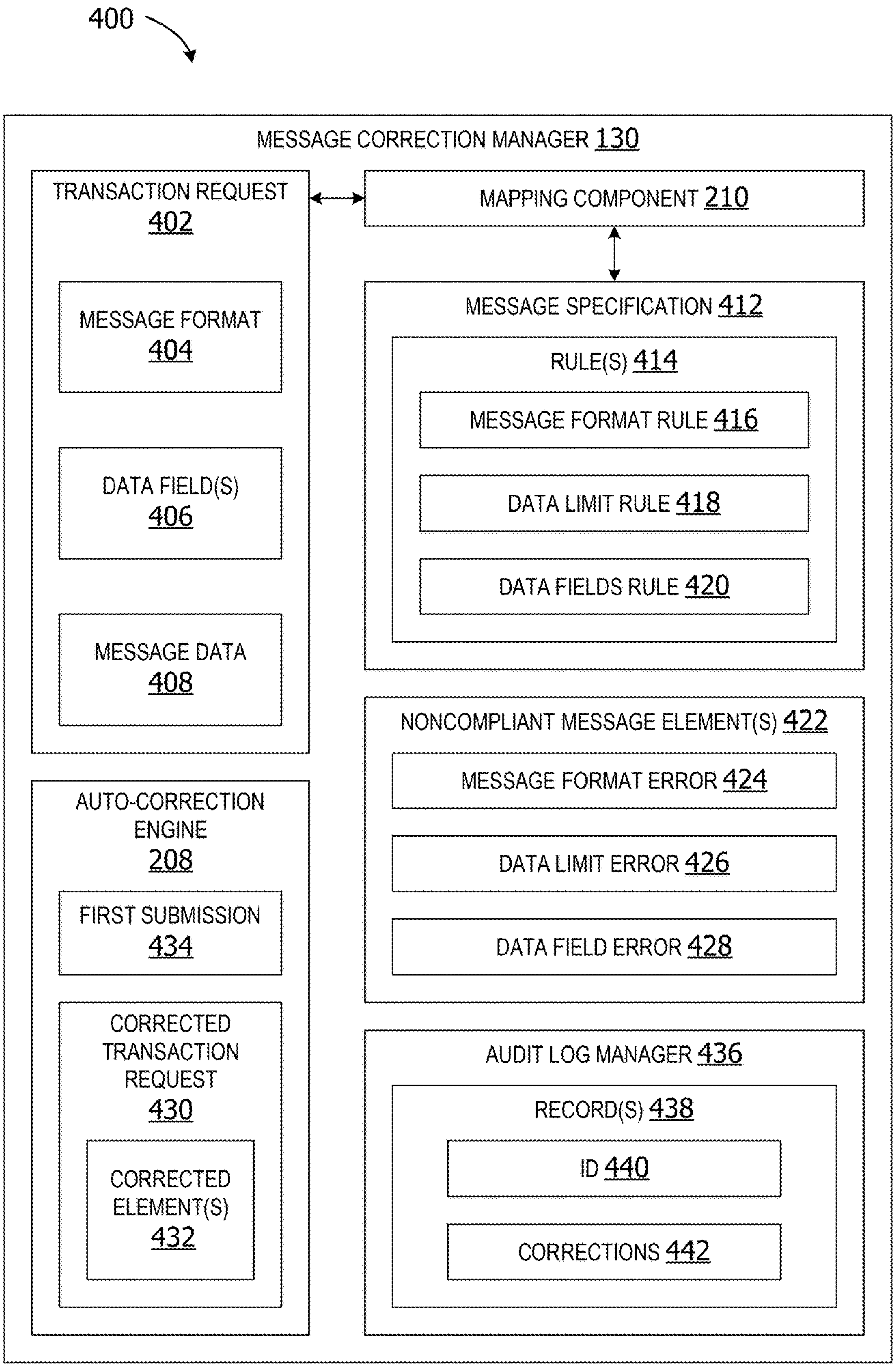
FIG. 4 is an exemplary block diagram illustrating a message correction manager for automatically correcting transaction requests.

FIG. 4 is an exemplary block diagram illustrating a message correction manager 130 for automatically correcting transaction requests. In this example, the message correction manager 130 obtains a transaction request 402. The transaction request 402 includes one or more elements, such as a message format 404, one or more data field(s) 406 and/or message data 408. A mapping component 210 maps the elements of the transaction request 402 to a message specification 412.

The message specification 412 includes a set of one or more rule(s) 414. The rule(s) 414 includes rules associated with industry standards, protocols, and other requirements for message acceptance by a recipient computing system, such as, but not limited to, the set of rules 136 in FIG. 1. In this example, the rule(s) 414 include at least one message format rule 416 dictating requirements for message formatting of the transaction request, at least one data limit rule 418 specifying message data limits associated with the transaction request, and/or at least one data fields rule 420 describing requirements for data fields (parameters) in the transaction request.

The message correction manager 130 identifies one or more noncompliant message elements 422. A noncompliant message element includes a message format error 424, a data limit error 426 and/or a data field error 428. A message format error 424 indicates a message format which fails to comply with message formatting requirements. A data limit error 426 indicates a transaction request exceeds a maximum data limit for messages. A data field error 428 can indicate a missing data field, an unacceptable/incorrect data field that should be removed, or a data field lacking required data within the field.

An auto correction engine 208 corrects the noncompliant message element(s) 422 to create a corrected transaction request 430. The corrected transaction request 430 can also be referred to as a corrected version of the original transaction request 402. The corrected transaction request 430 is created at the time of the first submission 434 of the transaction request to the designated recipient without requiring a second submission of the request. This reduces network bandwidth usage and enables the system to operate more efficiently from a technological perspective with reduced power usage and processor usage as well.

In some examples, an audit log manager 436 creates one or more record(s) 438 for each corrected transaction request, such as the corrected transaction request 430. The record for a corrected transaction request includes an ID 440 associated with the transaction request and an identification of corrections 442 made to the original version of the transaction request. The audit log manager 436 updates the audit log each time a new transaction request is corrected.

Figure 5:
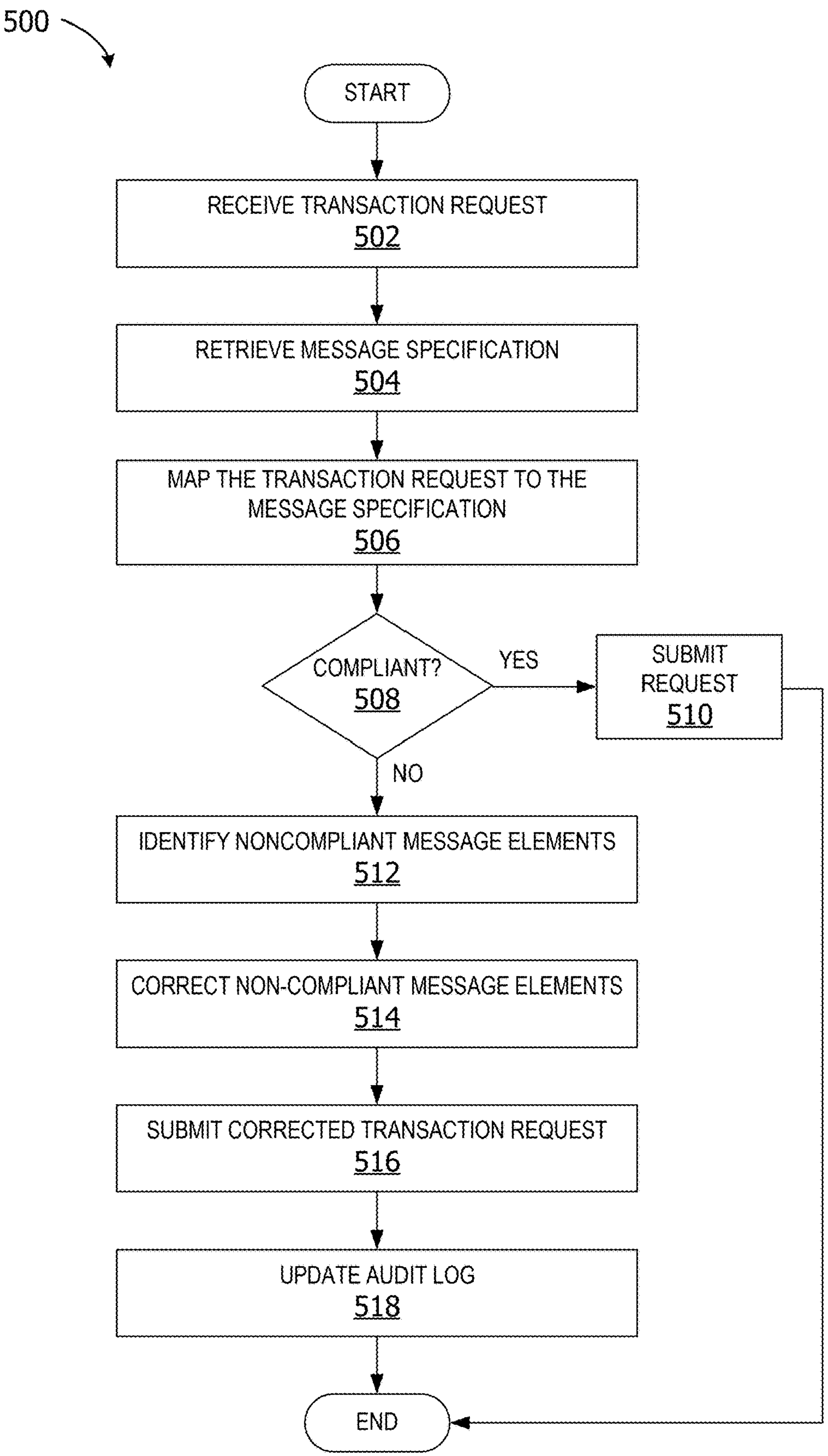
FIG. 5 is an exemplary flow chart illustrating operation of the computing device to automatically correct a transaction request.

FIG. 5 is an exemplary flow chart 500 illustrating operation of the computing device to automatically correct a transaction request. The process shown in FIG. 5 is performed by a message correction manager, executing on a computing device, such as the computing device 102 or the user device 116 in FIG. 1.

The process begins by receiving a transaction request at 502. The transaction request is an original version of a message, such as, but not limited to, the transaction request 132 in FIG. 1 and/or the transaction request 402 in FIG. 4. The message correction manager 130 retrieves a message specification associated with the designated recipient of the transaction request at 504. The message specification is a specification including rules, such as, but not limited to, the message specification 134 in FIG. 1 and/or the message specification 412 in FIG. 4. The message correction manager 130 maps the transaction request to the message specification at 506. The message correction manager determines if the transaction request is compliant with the message specification rules at 508. If yes, the original version of the transaction request is submitted to the designated recipient at 510 and the process terminates thereafter.

If the transaction request is not compliant at 508, the message correction manager identifies the noncompliant message elements in the transaction request at 512. The message correction manager 130 corrects the noncompliant message elements at 514. This creates a corrected version of the transaction request (corrected transaction request). The corrected transaction request is submitted to the designated recipient at 516. The message correction manager updates an audit log with a record of the corrected transaction request at 518. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
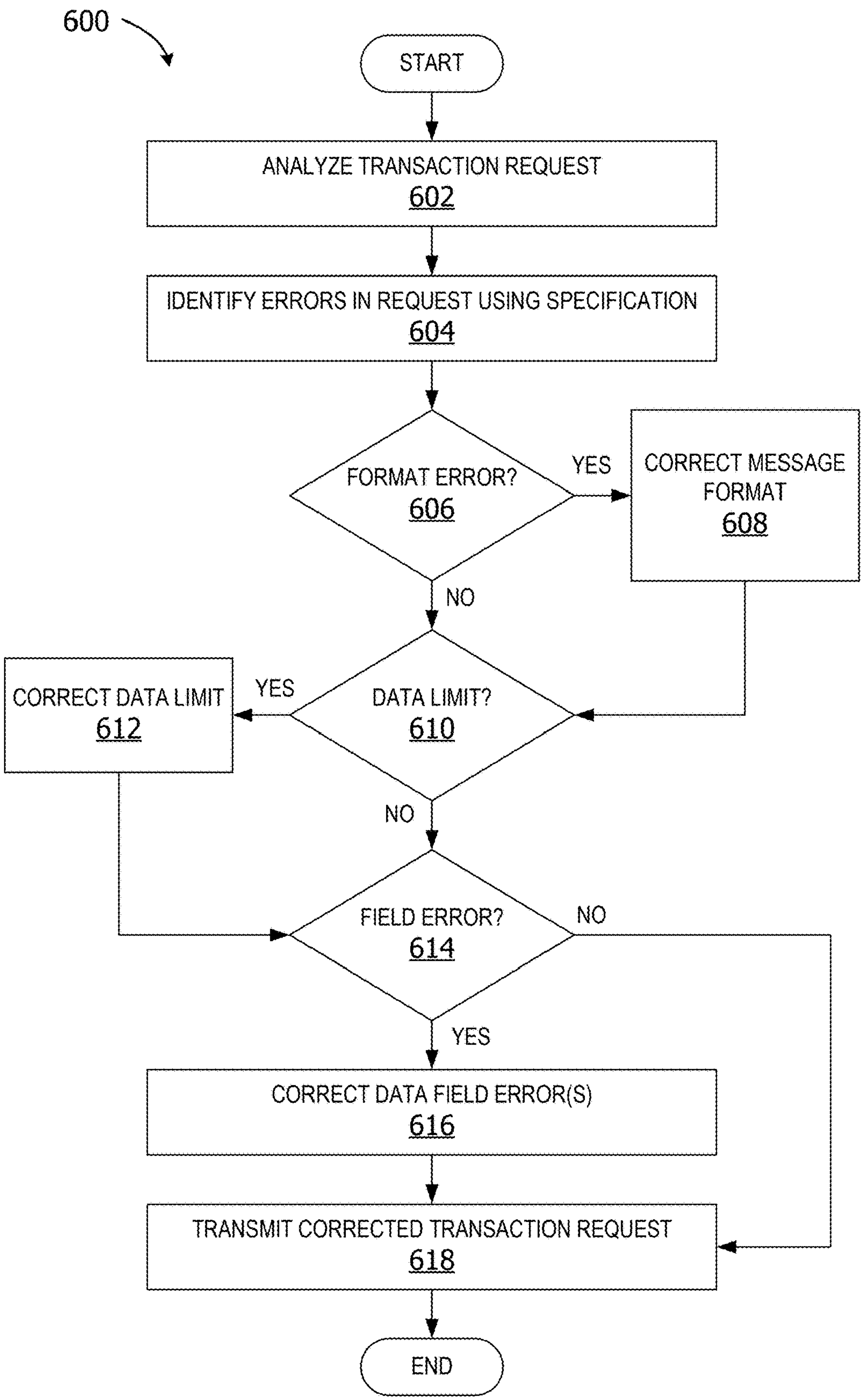
FIG. 6 is an exemplary flow chart illustrating operation of the computing device to automatically correct noncompliant message elements.

FIG. 6 is an exemplary flow chart 600 illustrating operation of the computing device to automatically correct noncompliant message elements. The process shown in FIG. 6 is performed by a message correction manager, executing on a computing device, such as the computing device 102 or the user device 116 in FIG. 1.

The process begins with a message correction manager analyzing a transaction request at 602. In some examples, the analysis includes mapping the transaction request to a message specification. The message correction manager identifies errors in the transaction request using the message specification at 604. The message correction manager determines if the transaction request contains any formatting errors at 606. If yes, the message correction manager automatically corrects the message format at 608. The message correction manager determines if the transaction request contains a data limit error at 610. If yes, the message correction manager automatically corrects the data limit at 612. The message correction manager determines if the transaction request contains a data field error at 614. If yes, the data field error(s) are corrected automatically at 616. The corrected transaction request is transmitted to the designated recipient at 618. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
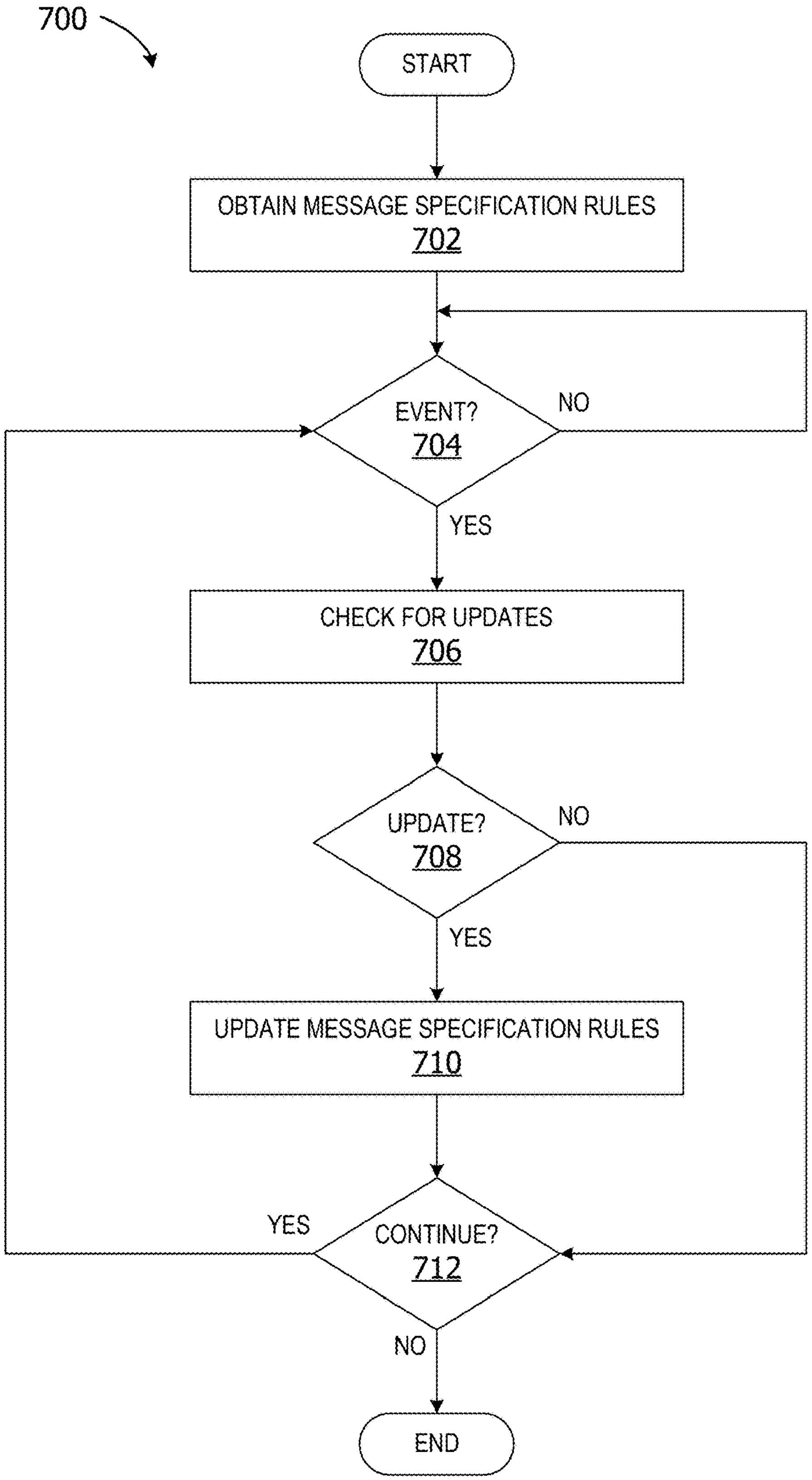
FIG. 7 is an exemplary flow chart illustrating operation of the computing device to dynamically check for specification updates for use in correcting transaction requests in real-time.

FIG. 7 is an exemplary flow chart 700 illustrating operation of the computing device to dynamically check for specification updates for use in correcting transaction requests in real-time. The process shown in FIG. 7 is performed by a message correction manager, executing on a computing device, such as the computing device 102 or the user device 116 in FIG. 1.

The process begins by obtaining message specification rules at 702. In some examples, the message specification rules are stored on a local data store, such as a data storage device. In other examples, the specifications are stored on a remote data store, such as a cloud storage. A determination is made whether a predetermined event has occurred at 704. The event is an event such as expiration of a time interval, a date and/or time, receiving a notification of a rules update, etc. If yes, the message correction manager checks one or more sources for updates to the message specification rules at 706. A determination is made whether an update (rule change) has occurred at 708. If yes, the message correction manager updates the message specification rules stored locally or on the remote data store at 710. A determination is made whether to continue at 712. The system iteratively performs operations 702 through 710 to dynamically update the message specification rules until a determination is made not to continue at 712. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

FIG. 8 is an exemplary table 800 illustrating elements of a transaction request. The request includes data fields, description of the field, source, length/format/values, device channel, message category, message inclusion and other data. However, the examples are not limited to the information shown in FIG. 8.

FIG. 9 is an exemplary request 900 for an application based payment authorization request. The request 900 includes information associated with message version, requester ID, requester name, etc. Additional, or less, information may be included in the request 900 in other examples.

Exemplary Operating Environment

Figure 10:
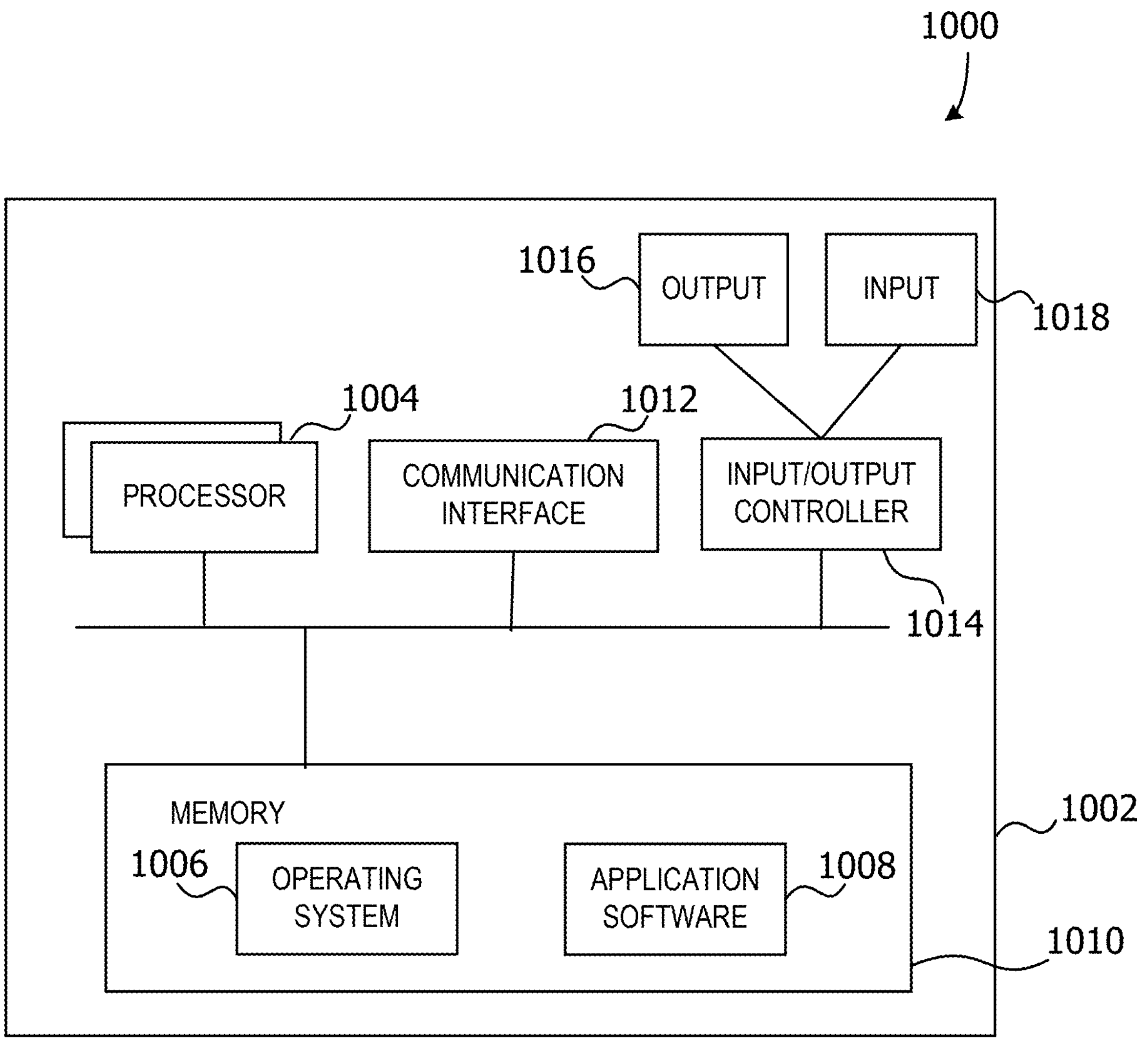
FIG. 10 is an exemplary block diagram illustrating a computing device suitable for implementing various aspects of the disclosure.

The present disclosure is operable with a computing apparatus according to an embodiment as a functional block diagram 1000 in FIG. 10. In an example, components of a computing apparatus 1002 are implemented as a part of an electronic device according to one or more embodiments described in this specification. The computing apparatus 1002 is a computing device, such as, but not limited to, the computing device 102 in FIG. 1.

The computing apparatus 1002 comprises one or more processors, such as the processor 1004 which can be microprocessors, controllers, or any other suitable type of processors for processing computer executable instructions to control the operation of the electronic device. The processor 1004 is a processor such as, but not limited to, the processor 106 in FIG. 1 and/or the processor 302 in FIG. 3. Alternatively, or in addition, the processor 1004 is any technology capable of executing logic or instructions, such as a hardcoded machine. In some examples, platform software comprising an operating system 1006 or any other suitable platform software is provided on the apparatus 1002 to enable application software 1008 to be executed on the device. In some examples, receiving and correcting transaction request messages is accomplished by software, hardware, and/or firmware.

In some examples, computer executable instructions are provided using any computer-readable media that is accessible by the computing apparatus 1002. Computer-readable media include, for example, computer storage media such as a memory 1010 and communications media. The memory 1010 is a device, such as, but not limited to, the memory 108 in FIG. 1.

Computer storage media, such as a memory 1010, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include a propagating signal. Propagated signals are not examples of computer storage media. Although the computer storage medium (the memory 1010) is shown within the computing apparatus 1002, it will be appreciated by a person skilled in the art, that, in some examples, the storage is distributed or located remotely and accessed via a network or other communication link (e.g., using a communication interface 1012).

Further, in some examples, the computing apparatus 1002 comprises an input/output controller 1014 configured to output information to one or more output devices 1016, for example a display or a speaker, which are separate from or integral to the electronic device. Additionally, or alternatively, the input/output controller 1014 is configured to receive and process an input from one or more input devices 1018, for example, a keyboard, a microphone, or a touchpad. In one example, the output device 1016 also acts as the input device. An example of such a device is a touch sensitive display. The input/output controller 1014 in other examples outputs data to devices other than the output device, e.g., a locally connected printing device. In some examples, a user provides input to the input device(s) 1016 and/or receives output from the output device(s) 1018.

The functionality described herein can be performed, at least in part, by one or more hardware logic components. The computing apparatus 1002 is configured by the program code when executed by the processor 1004 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Additional Examples

In some examples, the requester is a payment network and/or the recipient of the transaction request is a payment network. Payment networks are electronic systems that allow the transfer of funds between two or more parties. These networks facilitate the exchange of money between consumers, businesses, and financial institutions, and can operate locally, nationally, or globally. There are numerous payment networks in existence, and they can be divided into several categories based on the type of payment method they support, their reach, and the participants involved. But all these can be achieved via payment processor, financial technology (FinTechs), ASA, IDC, access control server (ACS), secure remote commerce (SRC) when they follow an industry approved standard specification.

Payment networks such as credit card and debit card networks typically provide APIs to allow payment aggregators to access their payment processing systems. These APIs typically include functionality for authorizing and settling transactions, as well as managing payment-related data such as cardholder information and transaction history.

The specifics of how APIs are shared between payment networks and payment aggregators can vary depending on the specific implementation. In general, however, payment networks will provide documentation and technical support to payment aggregators to help them integrate the APIs into their systems, Payment aggregators may also need to meet certain technical and security requirements in order to use the APIs, such as complying with industry standards like payment card industry (PCI) data security standard (DSS), etc.

Overall, intermediaries and their APIs can be an important component of the payment processing ecosystem, enabling payment networks and payment aggregators to work together to facilitate secure, efficient, and reliable payment processing for merchants and consumers alike.

The communication between various payment networks is facilitated by intermediaries, who often require different specifications to be followed in order to comply with industry standards. This results in a significant challenge for the payment processor, FinTech's, developers and support teams who are responsible for ensuring that the systems operate efficiently. Moreover, the specifications need to be updated frequently to keep up with new Europay, Mastercard, Visa (EMV) and/or other authentication specifications that are constantly being released. This creates a significant burden, authentication errors and/or transaction rejections on different applications used by credit card customers. Development of such applications requires additional time and resources to keep up with the evolving specifications for seamless experience.

The message correction manager, in some examples, enables conformance of various network/authentication specifications for payment networks. The message correction manager ML model is trained to analyze large amounts of transaction data and/or authentication data in real time to validate required specifications and perform auto-correction which is also pushed to an audit log database for record keeping, as well as training the model.

For example, the message correction manager analyzes transaction/authentication request parameters and data element with intended specifications designed to validate the request not only between application but also between networks and/or agents.

Examples of recipients include credit card payment networks that allow merchants to accept credit and debit cards as payment. Other examples of recipients of corrected transaction requests include automated clearing house (ACH) networks that facilitate electronic funds transfer (EFT) between banks and financial institutions. Examples include the Federal Reserve's FedACH network and the Clearing House's real-time payments (RTP) network.

In other examples, recipients include wire transfer networks that facilitate high-value funds transfers between financial institutions. Examples include the Society for Worldwide Interbank Financial Telecommunication (SWIFT) network and Fedwire. Mobile payment networks are recipient networks that allow consumers to make payments using mobile devices. The mobile payment networks include peer-to-peer (P2P) and business-to-business (B2B) networks. The recipients in other examples include cryptocurrency networks that facilitate the transfer of digital currencies between users.

The transaction requests include password-less authentication requests, biometric authentication, and/or card tokenization. These authentications follow fast identity online (FIDO) specifications, including a set of open technical specifications that define user authentication mechanisms that reduce the reliance on passwords.

An exemplary system includes a message correction manager that map a transaction request to a message specification associated with a recipient, the message specification comprising a set of rules for acceptance of a message by the recipient; identify a noncompliant message element associated with the transaction request based on mapping the transaction request to the message specification; correct the noncompliant message element prior to a first attempt to submit the transaction request to the recipient, wherein correcting the noncompliant message element creates a corrected transaction request; and submit the corrected transaction request to the recipient via a network.

An exemplary method comprises receiving a transaction request generated by a requester, the transaction request comprising a message format, a plurality of data fields, and message data; analyzing the transaction request using a message specification associated with a designated recipient of the transaction request at a first submission attempt, the message specification describing a set of rules associated with the message format, the plurality of data fields and the message data required for acceptance of a message by the designated recipient; identifying a noncompliant message element associated with the transaction request based on analysis of the transaction request using the message specification, the noncompliant message element comprising a portion of the transaction request that fails to comply with the message specification; and correcting the noncompliant message element dynamically for the first submission attempt; and submitting the corrected transaction request to the recipient at the first submission attempt via a network, wherein the corrected transaction request is corrected to comply with the message specification of the recipient without rejection of the transaction request by the recipient.

One or more computer storage media have computer-executable instructions that, upon execution by a processor, cause the processor to at least: map a transaction request to a message specification associated with a recipient, the message specification describing a set of rules for acceptance of a message by the recipient; identify a noncompliant message element associated with the transaction request based on mapping the transaction request to the message specification; correct the noncompliant message element automatically to conform with the message specification of the recipient without a rejection of the transaction request by the recipient; submit the corrected transaction request to the recipient via a network without rejection of the transaction request by the recipient; and update an audit log in a data storage device with a record indicating correction of the noncompliant message element associated with the corrected transaction request.

In some examples, the system checks for compliance with real-time transactions on the first attempt, prior to submission. The system is not correcting a faulty message that has already been rejected by the recipient system for resubmission. Instead, the system corrects a message at the first attempt without incurring a rejection based on noncompliance with a specification of a recipient. This reduces bandwidth, processing and memory usage associated with resubmitting a message multiple times following rejection of the original message based on noncompliance with a specification of the recipient. The system checks current industry standards dynamically, not statically. The system goes to the source of the standards rather than maintaining a copy of the standards. In some examples, the dynamic check is performed only once during a defined update period. That is, the standards change, for example, once per day. In such examples, the system performs the dynamic check only once per day and uses the most up-to-date standards during the rest of that day.

Alternatively, or in addition to the other examples described herein, examples include any combination of the following:

- update an audit log in a data storage device with a record indicating correction of the noncompliant message element, the record comprising a message identifier (ID) and description of the noncompliant element which is corrected in the corrected transaction request;
- perform automatic correction of a plurality of noncompliant message elements associated with an original version of the transaction request in real-time during a first attempt to submit the transaction request to the recipient;
- wherein a corrected version of the transaction request is created that is in condition for acceptance by the recipient without a failed first attempt to submit the transaction request;
- check for an updated rule associated with a plurality of message specifications corresponding to a plurality of recipients from a source of message specification updates at an occurrence of a predetermined event;
- analyze a message format of the transaction request using the message specification, the message specification comprising a message format rule describing a requirement associated with format of the transaction request;
- identify an error in the message format which fails to conform to the message format rule, wherein the noncompliant message element comprises the error in the message format;
- correct the error in the message format automatically in real-time;
- submit the corrected transaction request to the recipient in a first submission attempt via the network, wherein the corrected transaction request comprises the corrected message format;
- wherein the message format is corrected without receiving a rejection message from the recipient;
- analyze data associated with the transaction request using the message specification, the message specification comprising a data limit rule;
- identify a data limit error associated with the transaction request which fails to conform to the data limit rule, wherein the noncompliant message element comprises the data limit error;
- correct the data limit error automatically in real-time at a first submission attempt;
- submit the corrected transaction request to the recipient via the network;
- analyze a plurality of data fields associated with the transaction request using the message specification, the message specification comprising a data fields rule describing a requirement associated with data fields of the transaction request;
- identify an error in a data field of the plurality of data fields which fails to conform to the data fields rule, wherein the noncompliant message element comprises the error in the data field;
- correct the error in the data field automatically in real-time;
- submit the corrected transaction request to the recipient in a first submission attempt via the network, wherein the corrected transaction request comprises the corrected data field;
- receiving a transaction request generated by a requester, the transaction request comprising a message format, a plurality of data fields, and message data;
- analyzing the transaction request using a message specification associated with a designated recipient of the transaction request at a first submission attempt;
- the message specification describing a set of rules associated with the message format, the plurality of data fields and the message data required for acceptance of a message by the designated recipient;
- identifying a noncompliant message element associated with the transaction request based on analysis of the transaction request using the message specification, the noncompliant message element comprising a portion of the transaction request that fails to comply with the message specification;

correcting the noncompliant message element to form a corrected transaction request;

submitting the corrected transaction request to the recipient at the first submission attempt via a network;

wherein the corrected transaction request is corrected to comply with the message specification of the recipient without rejection of the transaction request by the recipient;

adding a record to an audit log in a data storage device, the record associated with the correction of the noncompliant message element associated with the corrected transaction request;

checking a plurality of records associated with corrected transaction requests within the audit log in response to detecting a rejection rate exceeding a threshold maximum message rejection rate;

analyzing the plurality of records to determine whether an error in the message correction manager impacting the rejection rate has occurred;

generating a notification identifying the error associated with the message correction manager, the notification including the rejection rate;

generating a list of corrected transaction messages generated by a message correction manager;

presenting the list of corrected transaction messages to a user via a user interface device, wherein a first corrected transaction message identifier is placed at a top of the list for viewing;

wherein a second corrected transaction message identifier is placed at a location below the first corrected transaction message identifier in the list;

wherein a user clicks on a corrected transaction message identifier to obtain additional information associated with errors which were automatically corrected prior to completing submission of the corrected transaction messages to designated recipients;

analyzing the message format of the transaction request using the message specification, the message specification comprising a message format rule describing a requirement associated with format of the transaction request;

identifying an error in the message format which fails to conform to the message format rule, wherein the noncompliant message element comprises the error in the message format;

correcting the error in the message format automatically in real-time;

submitting the corrected transaction request to the recipient in a first submission attempt via the network;

wherein the corrected transaction request comprises the corrected message format, wherein the message format is corrected without receiving a rejection message from the recipient;

analyzing the message data associated with the transaction request using the message specification, the message specification comprising a data limit rule;

identifying a data limit error associated with the transaction request which fails to conform to the data limit rule, wherein the noncompliant message element comprises the data limit error;

correcting the message data to conform to the data limit rule automatically in real-time;

submitting the corrected transaction request to the recipient via the network, wherein the data limit error is corrected without receiving any rejection messages from the recipient associated with the transaction request;

analyzing the plurality of data fields associated with the transaction request using the message specification, the message specification comprising a data fields rule describing a requirement associated with data fields of the transaction request;

identifying an error in a data field of the plurality of data fields which fails to conform to the data fields rule, wherein the noncompliant message element comprises the error in the data field;

correcting the error in the data field automatically in real-time;

submitting the corrected transaction request, including the corrected data field, to the recipient at the first submission attempt, wherein the correction is made without receiving a message rejection associated with the error in the data field;

mapping a transaction request to a message specification associated with a recipient, the message specification describing a set of rules for acceptance of a message by the recipient;

identifying a noncompliant message element associated with the transaction request based on mapping the transaction request to the message specification;

correcting the noncompliant message element automatically to conform with the message specification of the recipient without a rejection of the transaction request by the recipient;

updating an audit log in a data storage device with a record indicating correction of the noncompliant message element associated with the corrected transaction request;

accessing a plurality of rules associated with a plurality of message specification via a network;

updating a plurality of message specifications associated with a plurality of recipients in real-time using the plurality of rules, wherein the updated message specification is used to identify noncompliant message elements in transaction requests being submitted to the plurality of recipients;

detecting a rejection rate exceeding a threshold maximum message rejection rate;

checking a plurality of records associated with corrected transaction requests within the audit log;

analyzing the plurality of records to determine whether an error in the message correction manager impacting the rejection rate has occurred;

generating a notification identifying the error associated with the message correction manager, the notification including the rejection rate;

correcting of a plurality of noncompliant message elements associated with the transaction request in real-time at a first attempt to submit the message to the recipient, wherein the corrected request is accepted by the recipient at the first attempt;

analyzing the transaction request using the message specification during the first message submission attempt without receiving a message rejection from the recipient;

determining whether a message format, message data and a plurality of message fields comply with the set of rules associated with the message specification;

transmitting the transaction request to the recipient without making corrections responsive to a determination the message format, message data and the plurality of message fields comply with the set of rules;

identifying noncompliant elements associated with the transaction request in response to a determination the message format, the message data and the plurality of data fields fail to comply with the set of rules;

correcting the noncompliant elements automatically in real-time during the first message submission attempt, wherein the noncompliant element comprises at least one of a message format error, a data limit error, and a data field error;

requesting an updated set of rules from a source of message specification rules via a network at an occurrence of a predetermined event; and updating the message specification in real-time using the updated set of rules.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a transaction request generated by a requester, the transaction request comprising a message format, a plurality of data fields, and message data; exemplary means for analyzing the transaction request using a message specification associated with a designated recipient of the transaction request at a first submission attempt, the message specification describing a set of rules associated with the message format, the plurality of data fields and the message data required for acceptance of a message by the designated recipient; exemplary means for identifying a noncompliant message element associated with the transaction request based on analysis of the transaction request using the message specification, the noncompliant message element comprising a portion of the transaction request that fails to comply with the message specification; exemplary means for correcting the noncompliant message element to form a corrected transaction request; and exemplary means for submitting the corrected transaction request to the recipient at the first submission attempt via a network, wherein the corrected transaction request is corrected to comply with the message specification of the recipient without rejection of the transaction request by the recipient.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A mapping system for reducing message rejections, the system comprising:

a processor; and a computer-readable medium storing instructions that are operative upon execution by the processor to:

train a machine learning component of a message correction manager using successful transaction requests;

map a transaction request generated by a user device to a message specification associated with a recipient device, the message specification comprising a set of rules for acceptance of a message by the recipient device, the set of rules including one or more of: a message format, a message data limit, a plurality of data fields, and message data;

automatically identify, using the trained machine learning component of the message correction manager, a noncompliant message element associated with the transaction request based on the mapping of the transaction request to the message specification, the mapping including analyzing the transaction request by applying the set of rules to the message format, the plurality of data fields, and the message data available within the transaction request;

automatically correct, using the trained machine learning component of the message correction manager, the noncompliant message element prior to a first attempt to submit the transaction request to the recipient device from the user device, wherein correcting the noncompliant message element creates a corrected transaction request, wherein the noncompliant message element is corrected automatically to comply with the message specification of the recipient device;

submit the corrected transaction request to the recipient device via a network, wherein the corrected transaction request is corrected to comply with the message specification of the recipient device without rejection of the transaction request by the recipient device based on noncompliance with the message specification, thereby reducing message rejections by the recipient device;

generate an audit log comprising: corrections to the transaction request made by the trained machine learning component of the message correction manager, a date and time the transaction request was analyzed, corrected, and submitted to the recipient device, and a listing of errors identified in the transaction request; and provide at least a summary of the audit log to a user enabling the user to adjust a transaction request generation process to reduce a number of transactions requests requiring correction.

2. The system of claim 1, wherein the instructions are further operative to:

receive an update to the message specification for use in mapping a subsequent transaction request to the updated message specification.

3. The system of claim 1, wherein the instructions are further operative to:

display a list of corrected transaction requests on a user interface (UI), a first corrected transaction request being displayed at a top of the list above a second corrected transaction request based on a time of receipt of the transaction request, wherein the user selects a corrected transaction request from the list to view additional data associated therewith.

4. The system of claim 1, wherein the instructions are further operative to:

check for an updated rule associated with a plurality of message specifications corresponding to a plurality of recipient devices from a source of message specification updates at an occurrence of a predetermined event.

5. The system of claim 1, wherein the instructions are further operative to:

analyze a message format of the transaction request using the message specification, the message specification comprising a message format rule describing a requirement associated with a format of the transaction request;

identify an error in the message format which fails to conform to the message format rule, wherein the noncompliant message element comprises the error in the message format; and correct the error in the message format automatically in real-time; and submit the corrected transaction request to the recipient device in a first submission attempt via the network, wherein the corrected transaction request comprises the corrected message format, wherein the message format is corrected without receiving a rejection message from the recipient device.

6. The system of claim 1, wherein the instructions are further operative to:

analyze data associated with the transaction request using the message specification, the message specification comprising a data limit rule;

identify a data limit error associated with the transaction request which fails to conform to the data limit rule, wherein the noncompliant message element comprises the data limit error; and correct the data limit error automatically in real-time at a first submission attempt; and submit the corrected transaction request to the recipient device via the network.

7. The system of claim 1, wherein the instructions are further operative to:

analyze a plurality of data fields associated with the transaction request using the message specification, the message specification comprising a data fields rule describing a requirement associated with data fields of the transaction request;

identify an error in a data field of the plurality of data fields which fails to conform to the data fields rule, wherein the noncompliant message element comprises the error in the data field; and correct the error in the data field automatically in real-time; and submit the corrected transaction request to the recipient device in a first submission attempt via the network, wherein the corrected transaction request comprises a corrected data field.

8. A method for message specification mapping to reduce message rejections, the method comprising:

training a machine learning component of a message correction manager using successful transaction requests;

receiving a transaction request generated by a requester device, the transaction request comprising a message format, a plurality of data fields, and message data;

analyzing the transaction request using a message specification associated with a recipient device of the transaction request prior to a first submission attempt to the recipient device from the requester device, the message specification describing a set of rules associated with the message format, the plurality of data fields, and the message data required for acceptance of a message by the recipient device;

automatically identifying, using the trained machine learning component of the message correction manager, a noncompliant message element associated with the transaction request based on the analysis of the transaction request using the message specification the analysis comprising applying the set of rules to the message format, the plurality of data fields, and the message data available within the transaction request, the noncompliant message element comprising a portion of the transaction request that fails to comply with the message specification;

automatically correcting, using the trained machine learning component of the message correction manager, the noncompliant message element to form a corrected transaction request; and submitting the corrected transaction request to the recipient device at the first submission attempt via a network, wherein the corrected transaction request complies with the message specification of the recipient device to prevent rejection of the transaction request by the recipient device based on noncompliance with the message specification;

generating an audit log comprising: corrections to the transaction request made by the trained machine learning component of the message correction manager, a date and time the transaction request was analyzed, corrected, and submitted to the recipient device, and a listing of errors identified in the transaction request; and providing at least a summary of the audit log to a user enabling the user to adjust a transaction request generation process to reduce a number of transactions requests requiring correction.

9. The method of claim 8, further comprising:

adding a record to the audit log in a data storage device, the record associated with the correction of the noncompliant message element associated with the corrected transaction request.

10. The method of claim 8, further comprising:

displaying a list of corrected transaction requests on a user interface (UI), a first corrected transaction request being displayed at a top of the list above a second corrected transaction request based on a time of receipt of the transaction request, wherein the user selects a corrected transaction request from the list to view additional data associated therewith.

11. The method of claim 8, further comprising:

generating a list of corrected transaction requests generated by the message correction manager; and presenting the list of corrected transaction requests to the user via a user interface device, wherein a first corrected transaction request identifier is placed at a top of the list for viewing.

12. The method of claim 8, further comprising:

analyzing the message format of the transaction request using the message specification, the message specification comprising a message format rule describing a requirement associated with format of the transaction request;

identifying an error in the message format which fails to conform to the message format rule, wherein the noncompliant message element comprises the error in the message format; and correcting the error in the message format automatically in real-time; and submitting the corrected transaction request to the recipient device in a first submission attempt via the network, wherein the corrected transaction request comprises the corrected message format, wherein the message format is corrected without receiving a rejection message from the recipient device.

13. The method of claim 8, further comprising:

analyzing the message data associated with the transaction request using the message specification, the message specification comprising a data limit rule;

identifying a data limit error associated with the transaction request which fails to conform to the data limit rule, wherein the noncompliant message element comprises the data limit error; and correcting the message data to conform to the data limit rule automatically in real-time; and submitting the corrected transaction request to the recipient device via the network, wherein the data limit error is corrected without receiving any rejection messages from the recipient device associated with the transaction request.

14. The method of claim 8, further comprising:

analyzing the plurality of data fields associated with the transaction request using the message specification, the message specification comprising a data fields rule describing a requirement associated with data fields of the transaction request;

identifying an error in a data field of the plurality of data fields which fails to conform to the data fields rule, wherein the noncompliant message element comprises the error in the data field;

correcting the error in the data field automatically in real-time; and submitting the corrected transaction request, including a corrected data field, to the recipient device at the first submission attempt, wherein the correction is made without receiving a message rejection associated with the error in the data field.

15. A computer storage medium having computer-executable instructions stored thereon, which, upon execution by a computer, cause the computer to perform operations comprising:

training a machine learning component of a message correction manager using successful transaction requests;

mapping a transaction request generated by a user device to a message specification associated with a recipient device, the message specification describing a set of rules for acceptance of a message by the recipient device, the set of rules including one or more of: a message format, a message data limit, a plurality of data fields, and message data;

automatically identifying, using the trained machine learning component of the message correction manager, a noncompliant message element associated with the transaction request based on the mapping of the transaction request to the message specification, the mapping including analyzing the transaction request by applying the set of rules to the message format, the plurality of data fields, and the message data available within the transaction request;

automatically correcting, using the trained machine learning component of the message correction manager, the noncompliant message element to conform with the message specification of the recipient device without a rejection of the transaction request by the recipient device;

submitting a corrected transaction request to the recipient device via a network without having first received a rejection of the transaction request by the user device from the recipient device based on noncompliance with the message specification;

generating an audit log comprising: corrections to the transaction request made by the trained machine learning component of the message correction manager, a date and time the transaction request was analyzed, corrected, and submitted to the recipient device, and a listing of errors identified in the transaction request; and providing at least a summary of the audit log to a user enabling the user to adjust a transaction request generation process to reduce a number of transactions requests requiring correction.

16. The computer storage medium of claim 15, wherein the operations further comprise:

accessing a plurality of rules associated with a plurality of message specifications via a network; and updating a plurality of message specifications associated with a plurality of recipient devices in real-time using the plurality of rules, wherein the updated plurality of message specifications is used to identify noncompliant message elements in transaction requests being submitted to the plurality of recipient devices.

17. The computer storage medium of claim 15, wherein the operations further comprise:

detecting a rejection rate exceeding a threshold maximum message rejection rate; and generating a notification including the rejection rate.

18. The computer storage medium of claim 15, wherein the operations further comprise:

correcting of a plurality of noncompliant message elements associated with the transaction request in real-time at a first attempt to submit the message to the recipient device, wherein the corrected transaction request is accepted by the recipient device at the first attempt.

19. The computer storage medium of claim 15, wherein the operations further comprise:

analyzing the transaction request using the message specification during a first message submission attempt without receiving a message rejection from the recipient device;

determining whether a message format, message data and a plurality of message fields comply with the set of rules associated with the message specification;

transmitting the transaction request to the recipient device without making corrections responsive to a determination that the message format, message data and the plurality of message fields comply with the set of rules;

identifying noncompliant elements associated with the transaction request in response to a determination the message format, the message data and the plurality of message fields fail to comply with the set of rules; and correcting the noncompliant elements automatically in real-time during the first message submission attempt, wherein the noncompliant message element comprises at least one of a message format error, a data limit error, and a data field error.

20. The computer storage medium of claim 15, wherein the operations further comprise:

requesting an updated set of rules from a source of message specification rules via a network at an occurrence of a predetermined event; and updating the message specification in real-time using the updated set of rules.

* * * * *